United States Patent [19]

Leonard

[11] Patent Number: 5,141,181
[45] Date of Patent: * Aug. 25, 1992

[54] LAUNCH VEHICLE WITH INTERSTAGE PROPELLANT MANIFOLDING

[76] Inventor: Byron P. Leonard, 13700 Tahiti Way, Marina Del Rey, Calif. 90292

[*] Notice: The portion of the term of this patent subsequent to Sep. 1, 2009 has been disclaimed.

[21] Appl. No.: 417,736

[22] Filed: Oct. 5, 1989

[51] Int. Cl.⁵ .............................................. B64G 1/40
[52] U.S. Cl. ...................................... 244/172; 244/2; 244/158 R
[58] Field of Search .................... 244/158 R, 159, 160, 244/161, 164, 169, 172, 135 R, 135 C; 102/374, 381

[56] References Cited

U.S. PATENT DOCUMENTS

| | | |
|---|---|---|
| 2,755,046 | 10/1954 | Underwood, Jr. |
| 3,369,771 | 2/1968 | Walley et al. ............... 244/162 |
| 3,782,400 | 1/1974 | Hardison et al. |
| 3,934,512 | 1/1976 | Adachi |
| 3,977,633 | 8/1976 | Keigler et al. |
| 4,012,012 | 3/1977 | Ligler |
| 4,104,878 | 8/1978 | Chase |
| 4,451,017 | 5/1984 | Marshall |
| 4,471,926 | 9/1984 | Steel, III ............... 244/172 |
| 4,505,124 | 3/1985 | Mayer |
| 4,575,029 | 3/1986 | Harwood et al. ............... 244/172 |
| 4,591,115 | 5/1986 | DeCarlo |
| 4,609,169 | 9/1986 | Schweickert et al. |
| 4,723,736 | 2/1988 | Rider |
| 4,796,839 | 1/1989 | Davis |
| 4,807,833 | 2/1989 | Pori |
| 4,834,324 | 5/1989 | Criswell |

FOREIGN PATENT DOCUMENTS 2623774 6/1989 France.

OTHER PUBLICATIONS

Flight Performance Handbook for Powered Flight Operations (Revised 1963), Ed. J. Fredrick White, pp. 5-80 through 5-85.
"Predicting Launch Vehicle Failure" Aerospace America, Sep. 1989, pp. 36-46.
Titan Background Literature.
Delta Background Literature.
Atlas Background Literature.
Aviation Week & Space Tech. Jun. 9, 1966 pp. 77, 79-80, 87, 89, 91.

Primary Examiner—Galen Barefoot
Attorney, Agent, or Firm—Spensley Horn Jubas & Lubitz

[57] ABSTRACT

An improved launch vehicle having a central vehicle stack with an upper stage, a lower stage and payload, and having one or more additional parallel burning stages burning in parallel with the lower stage. Interstage propellant transfer is provided from the shorter to longer burning parallel stages. The additional parallel stages are preferably of substantially the same, or greater, length as the central lower stage. The central lower stage and parallel additional stages may preferably have substantially the same thrust capabilities at liftoff and sufficient thrust to provide redundancy and hence increased reliability, in the event of loss of one of the parallel stages.

29 Claims, 7 Drawing Sheets

LAUNCH VEHICLE WITH INTERSTAGE PROPELLANT MANIFOLDING

BACKGROUND OF THE INVENTION

1. Field of the Invention

The present invention relates to multi-stage launch vehicles. In particular, the present invention relates to relatively high performance launch vehicles for placing payloads into earth orbit and beyond, i.e., escape from the gravity of Earth.

2. Description of Prior Art and Related Information

The various approaches to launch vehicle design may be generally classified into single stage or multistage launch vehicle systems. Single stage launch vehicles employ a single thruster stage which includes all the propellant required to deliver a specified velocity to the payload. Since considerable mass is contained in the propellant tanks, engines and thrust structure, which mass becomes unnecessary once propellant therein is expended, a single stage launch vehicle is inherently of less than optimum efficiency. Multi-stage launch vehicles, where an entire stage, including propellant tanks and engines, is jettisoned after expenditure, have accordingly been developed and gained predominance for earth orbit launch applications. Due to their simplicity, however, single stage launch vehicles will, in general, be cheaper and more reliable than multistage launch vehicles.

A single stage vehicle with multiple engines which can be staged has also been employed. This vehicle is referred to as the Atlas launch vehicle and is made by General Dynamics. The Atlas stage is operated in a mode where only engines and part of their thrust structure are staged at an appropriate time in flight. (Due to this partial staging, this is commonly called a stage and a half launch vehicle.) A stage and a half launch vehicle has two important features: (1) it reduces total weight at a time in flight when the jettisoned weight is no longer necessary to the efficient performance of the stage, and (2) it reduces the thrust at a time when the propellant weight has been reduced to the point that, with all engines continuing to thrust, the acceleration loads (thrust to weight ratio) delivered to the stage and its payload would be greater than desired from a structural design standpoint.

The Atlas was originally designed as an ICBM (Intercontinental Ballistic Missile). The velocity requirements for ICBMs are substantially lower than the velocities required to place a payload into Earth Orbit. To achieve increased capabilities for this launch vehicle updating of engine thrusts and lengthening of the stage(s) to accommodate increases in propellant have been employed. Substantial further increases in performances of these vehicles are inhibited, however, by the difficulties associated with achieving further increases in engine thrusts and increased stage lengths. In particular, the stage length problem is very severe since the ratio of the overall length to diameter of a launch vehicle is critical to its stiffness, which in turn, is critical to the dynamic loads it can withstand due to high altitude winds that it encounters as it traverses the Earth's atmosphere. Also, the wind loads increase as the length of the vehicle increases. Very similar problems are also presented with providing increased payload to Earth Orbit capabilities for the other expandable U.S. launch vehicles, the Titan and Delta launch vehicles, since these were also originally designed as ICBMs or IRBMs (Intermediate Range Ballistic Missiles).

These difficulties in providing further upgrades in capability may be appreciated by consideration of one specific upgraded Atlas launch vehicle, the Atlas IIA. This upgraded Atlas, the Atlas IIA is one of three current unmanned expendable U.S. Space Launch Vehicles. The others are the Titan IV and Delta II. An Atlas IIA configuration is shown in FIG. 1. The Atlas IIA is a two and a half stage launch vehicle with the lower stage being an Atlas one and a half stage having three engines 1, 2, and 3, two of which, 1 and 3, are booster engines which are staged during first burn and have a thrust of about 270,000 lbs. The sustainer engine 2 which continues to thrust until the Atlas lower stage burns out, has a smaller thrust (about 81,000 lbs.) than the booster engines 1 and 3. The upper stage 4 is a Centaur rocket, also built by General Dynamics. The Centaur is propelled by two $LO^2/H^2$ cryogenic engines. The particular Atlas IIA configuration shown in FIG. 1 has a payload performance capability to Geosynchronous Transfer Orbit (GTO) of about 6200 lbs and an overall length L of 155 ft. The Atlas II family of launch vehicles based on the general Atlas/Centaur series stages, has several configurations which range in payload capability to GTO from about 3800 lbs. to 8200 lbs.

The Atlas lower stage, has undergone several design changes to improve its performance for space launch missions. However, increased engine thrusts have reached a level where quantum improvements will require new engine developments. Also, increased velocity capabilities of the stage have been achieved by lengthening the stage to accommodate more propellant while its original ten foot diameter has remained fixed. As mentioned above, the length to diameter ratio of a launch vehicle is critical to its stiffness, which in turn is critical to the dynamic loads it can withstand due to high altitude winds it encounters as it traverses the Earth's atmosphere. The wind loads must be limited both to protect the structural integrity of the vehicle and to maintain its control authority by means of the engines thrusting at varying gimbal angles to maintain the proper vehicle attitude. Small increases in performance have been achieved by employing load alleviating devices which reduce the wind loads. Although stiffening the Atlas is a possibility, the design changes required to achieve a substantial improvement would be extensive. However, it is clear that large performance increases will not be achieved without substantial increases in the stiffness of the vehicles and increases in engine thrust either by new engine developments or increasing the numbers of existing engines in the vehicle.

The ultimate effect of this problem is to limit Atlas II launches to specified high altitude wind conditions. This, in turn, limits the launch availability of the vehicle at a time when high launch vehicle availability is becoming a primary operational requirement.

Launch vehicles utilizing Atlas stages burning in parallel might be employed to overcome the length to diameter ratio barrier to Atlas II growth. FIGS. 2(b) and 2(c) illustrate two launch vehicles utilizing one and two Atlas stage "strap ons", respectively, to a modified Atlas IIA stage with a Centaur upper stage. The Atlas IIA configuration illustrated in FIG. 1 is also shown for comparison in FIG. 2(a). A modified Atlas II launch vehicle 5 with a single Atlas stage "strap on" would have an overall length L somewhat greater than the Atlas IIA, i.e., L″=approximately 180 ft. This is due to the fact that the Atlas "strap on" stage 6 and the Atlas core stage 7, optimized for performance, are about 0.75 and 1.2 times the length of the conventional Atlas IIA stage shown in FIG. 2(a). Thus, the vehicle 5 does not present an attractive option for growth because the overall vehicle length to diameter ratio would require substantial redesign to deal with the high altitude wind loads problem. Another modified launch vehicle 8, employing an Atlas IIA with a long Atlas stage 9 and Centaur upper stage with two additional Atlas stage strap ons, shown in FIG. 2(c), would have an even greater overall length, L″=186 ft. An additional consideration for these two launch vehicle configurations is that the first stage would be staged before reaching the high altitude winds regime that would cause load problems for the long Atlas second stage 7, 9 plus Centaur stage plus payload.

In addition to the above noted problems, current U.S. launch vehicles are also limited by their reliability. All of the engines in the Atlas IIA, Titan IV and Delta II must function properly to achieve a successful launch. Accordingly, most launch vehicle failures are due to one of the engine's failing. This problem cannot be dealt with by adopting an engine-out strategy because none of these vehicles have a sufficient number of engines to meet their mission performance requirements with an engine failed (engine-out capability).

Accordingly, there presently exists a need to improve the performance, reliability and cost effectiveness of one or more of the current U.S. expendable launch vehicles.

SUMMARY OF THE INVENTION

The present invention provides an improved launch vehicle with significantly increased performance over existing expendable launch vehicles while avoiding high altitude wind loads and minimizing reliability problems. It further provides a redundant stage capability in that if one of several stages fails it may be jettisoned to provide launch vehicle abort to Low Earth Orbit capability, thus preserving the payload for subsequent recovery or transfer from LEO to a higher energy mission orbit.

In preferred embodiments, the present invention further provides an improved expendable launch vehicle, employing modifications of stages currently in use in the U.S., having significantly increased payload and/or orbit altitude capabilities and reliabilities.

The present invention provides an improved launch vehicle having a central launch vehicle stack with upper and lower stages, configured to burn in series, and additional stages configured in a side-by-side relationship with the core stage(s) and which burn in parallel with the core stage(s). These additional parallel stages have lengths substantially equal to or greater than the stage of the central vehicle stack. Interstage propellant manifolding between the parallel burn stages is provided which permits all engines in the parallel stages to utilize propellants from the shorter burning additional stage tanks, thus reducing the amount of propellant required in the longer burning central stage. This has the effect of reducing the length, for a given diameter, and weight of the longer burning stage thus increasing structural stiffness and the performance of the launch vehicle for a given amount of total thrust.

In a further aspect of the present invention, each of the additional parallel stages may be provided with substantially the same thrust capability as the central stage. In a three parallel stage embodiment, with a fourth stage burning in series, sufficient thrust may be provided such that any two functioning lower stages, functioning with the fourth stage, may lift the payload into Low Earth Orbit. This provides a redundant stage capability in case of failure. This allows the provision of increased reliability, with minimal significant penalties in performance even though an additional stage is added.

In a specific preferred embodiment, the present invention provides an improved expendable space launch vehicle, utilizing stages currently in use in the U.S. such as Atlas and Centaur, having an increased performance and reliability. Preferably, plural stages of such launch vehicles are combined as multiple, parallel burn stages. With interstage propellant manifolding the Nth stage must carry only the propellant which is burned by all active stages during the Nth burn, i.e. the propellant that the Nth stage burns plus that which it supplies to the engines of the higher numbered stages which participate in that burn. This decreases the length of upper stages that would be required with no interstage propellant manifold. Thus, the manifold provides higher launch vehicle performance by means of higher thrust of parallel stage burn and lower upper stage weight. Additionally, the multiple parallel burning stages attached to each other provide a stiffer launch vehicle than the single stages with limited diameters. Furthermore, this condition persists until after the vehicle reaches a point above the Earth where high altitude wind loads on the vehicle are no longer a problem. Thus, effective utilization of existing launch vehicle stages in upgraded vehicles is provided.

DETAILED DESCRIPTION OF THE INVENTION

Figure 1:
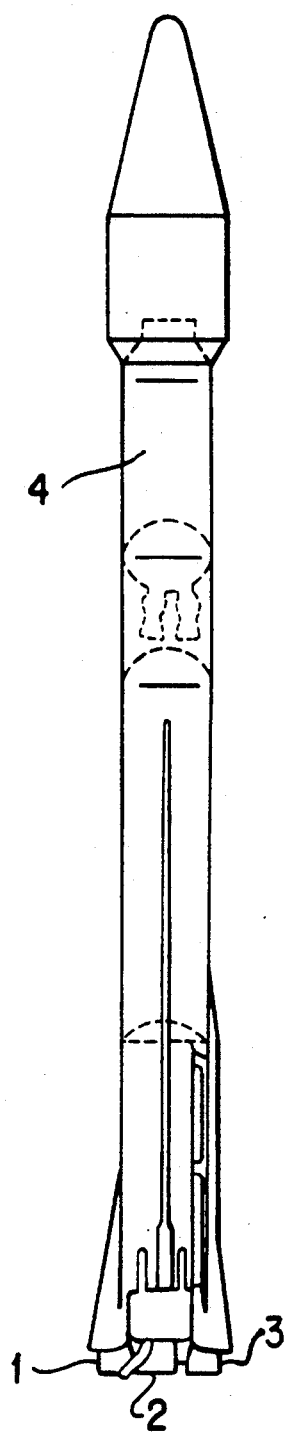
FIG. 1 is a side view of a prior art Atlas IIA type launch vehicle.
Figures 2A, 2B, 2C:
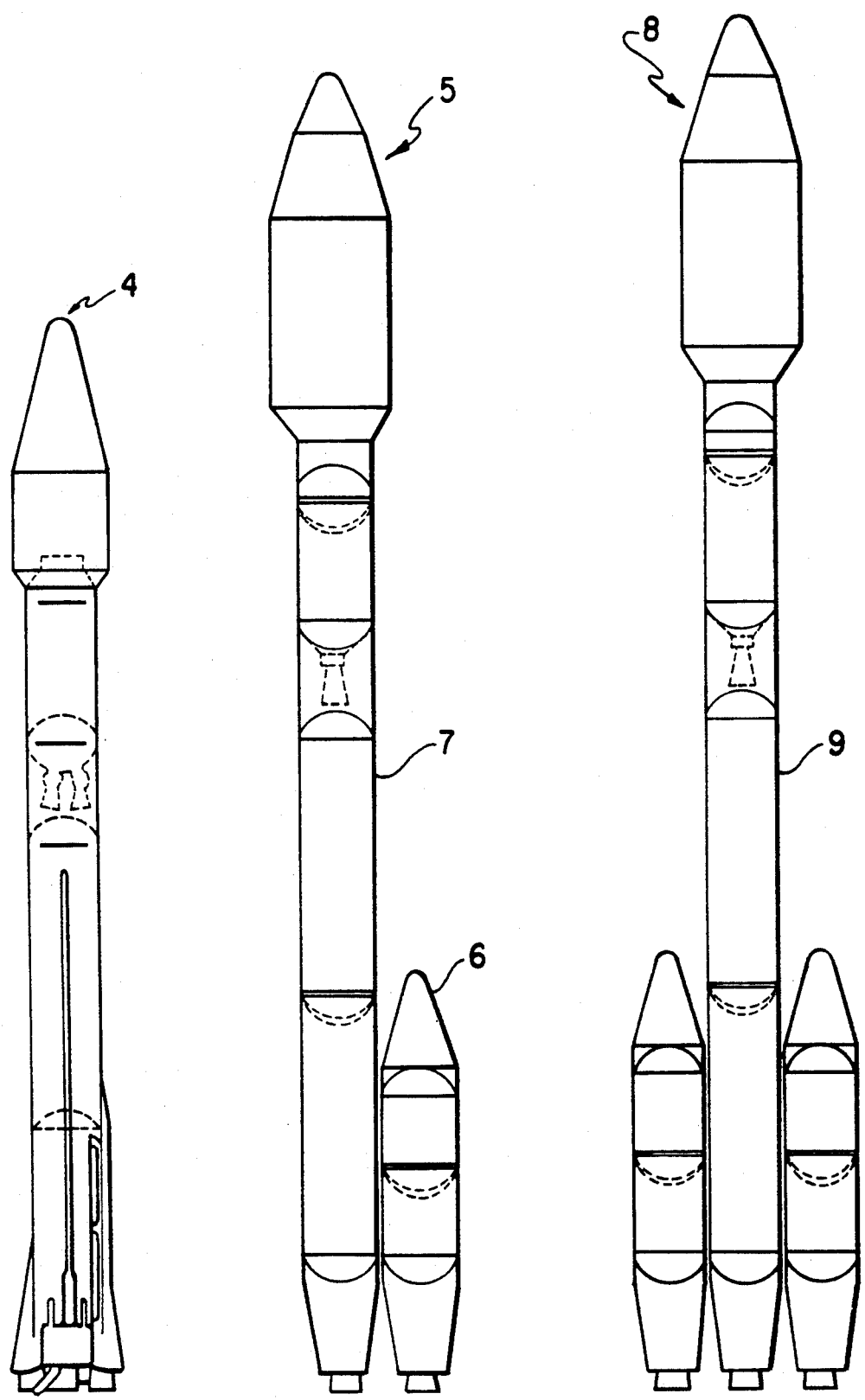
FIGS. 2(a)-(c) are side views of a prior art Atlas IIA launch vehicle, an upgraded parallel burn Atlas IIA launch vehicle, and a further upgraded ATLAS IIA, respectively.
Figure 3A:
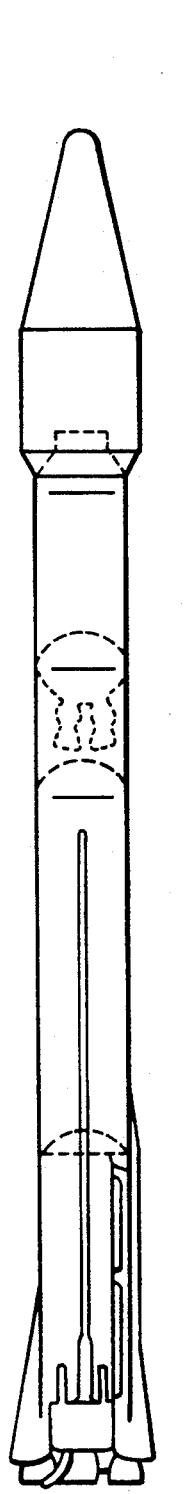
FIG. 3(a) is a side view of a prior art Atlas IIA type launch vehicle.
Figure 3B:
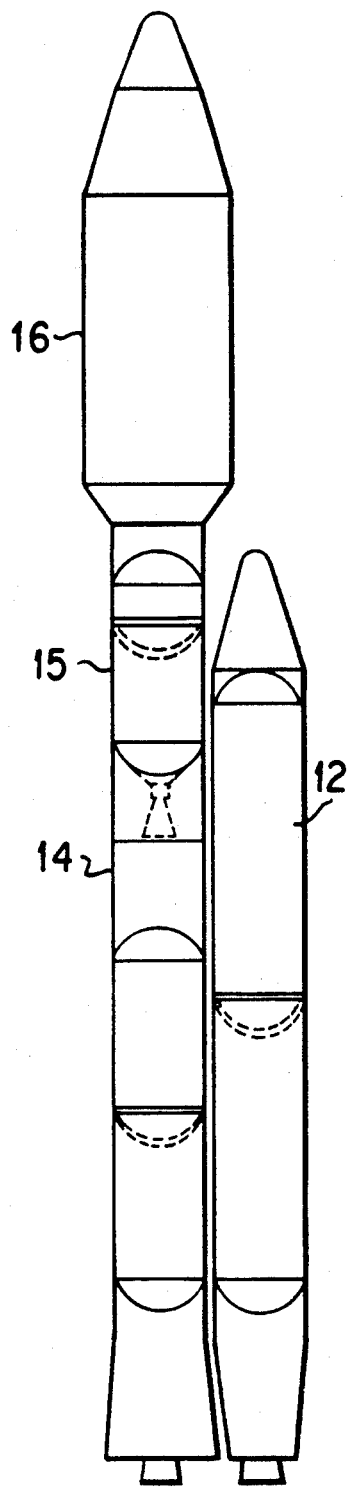
FIG. 3(b) is a side view of an improved launch vehicle in accordance with the present invention.

FIG. 3(b) illustrates an improved launch vehicle 10 in accordance with the present invention. For illustrative purposes, launch vehicle 10 is shown based on an Atlas IIA type launch vehicle. (A conventional Atlas IIA having an Atlas lower stage and Centaur upper stage is shown in FIG. 3(a) for comparison.) However, it will be appreciated that the improved launch vehicle design may be employed with other existing designs for launch vehicle stages or with new vehicle stages.

Launch vehicle 10, as illustrated in FIG. 3(b), is a three and a half stage vehicle, utilizing two modified Atlas stages 12 and 14, burning in parallel as first and second stages, respectively. The second stage 14 of the vehicle 10 is a stage and a half Atlas type vehicle. Launch vehicle 10 employs a modified Centaur 15 for the upper stage in the central vehicle stack, which burns in series with the second stage 14. The modified Centaur 15 may preferably be propelled by a single, up rated RL-10 engine with an Isp of 460 seconds and a 34,000 lbs. thrust.

Sizing the stages for high performance, the Atlas first stage 12 is approximately 1.2 times the Atlas IIA stage of FIG. 3(a), whereas the Atlas second stage 14 is only about 0.75 times the Atlas IIA stage. Thus both vehicle stacks, i.e., the first stage 12 alone and the second stage 14 plus Centaur stage 15 and the payload and fairing 16 are near the same length as the Atlas IIA vehicle stack, L=155 ft. The dimensions of the various stages are illustrated in FIG. 3(b) for one specific example. It will be appreciated that many other dimensions are possible for optimization for specific launch applications. Generally, however, first stage 12 will be substantially the same length as or greater than second stage 14.

The launch vehicle 10 is stiffened during its burn by a number of interstage structural load carrying and separation attachments (not shown). These may take the form of explosive bolts or other releasable rigid coupling mechanisms. As will be discussed in more detail below in relation to FIG. 4, interstage propellant manifolding is employed between stages 12 and 14. As a result, the end of the first burn of the vehicle 10 occurs at an altitude above that where high altitude winds present a problem. Thus, the high altitude winds will not be a major limitation on launch availability.

Figure 4:
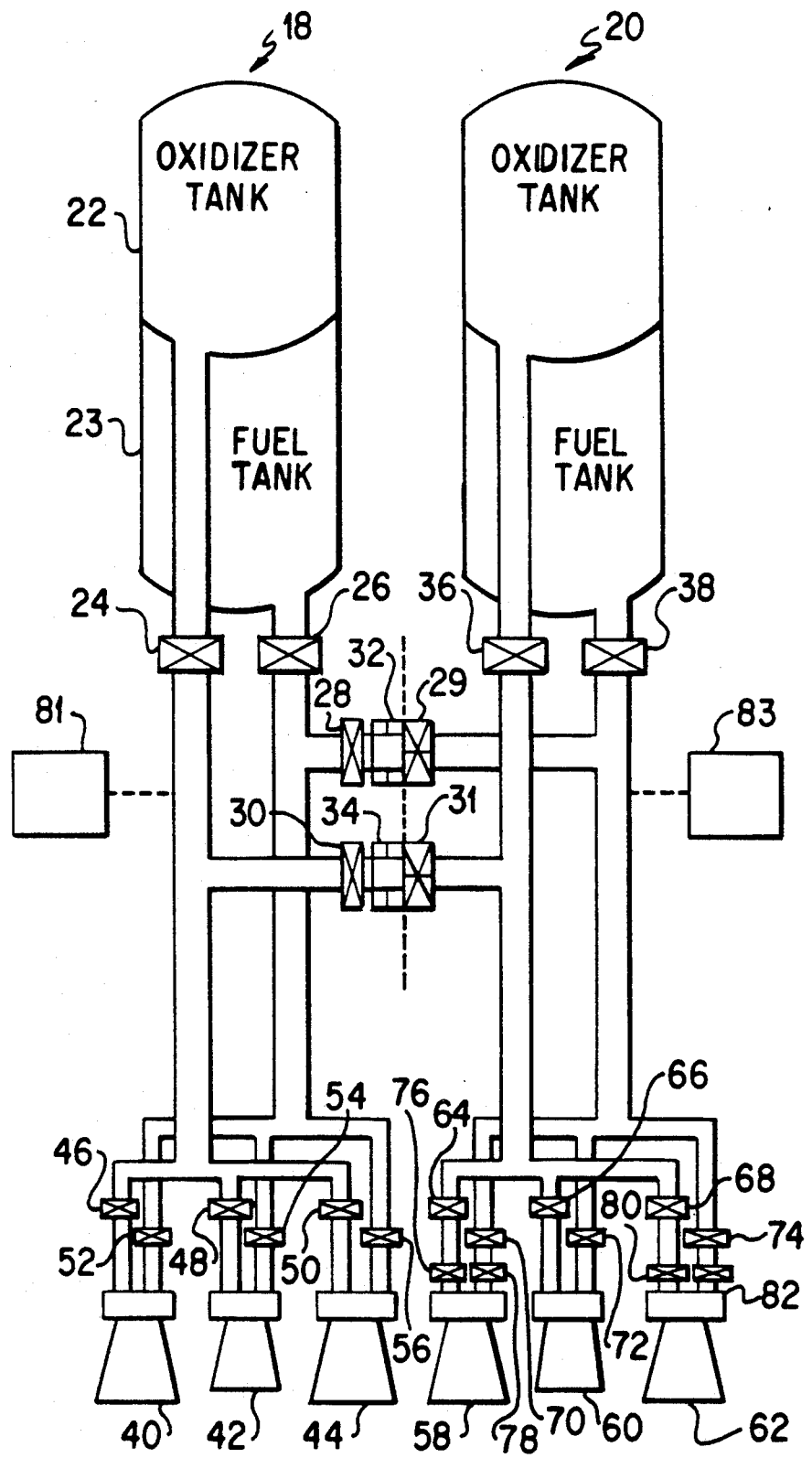
FIG. 4 is a schematic drawing illustrating the interstage propellant manifolding employed in the improved launch vehicle of the present invention.

Referring to FIG. 4, a preferred embodiment for controlling interstage propellant transfer between the parallel burn stages is illustrated in a cross-sectional schematic view. In a preferred embodiment, propellant utilization by both stages 12 and 14 engines from first stage 12 propellant tanks is achieved y a manifold structure interconnecting the parallel stages 12 and 14 in the vehicle. It will be appreciated that other forms of interstage propellant transfer may also be employed, however, including active pumping and passive transfer systems. Referring to FIG. 4, the propellant tanks 18 for first stage 12 and 20 of second stage 14 are shown, each of which includes an oxidizer tank and a fuel tank. The oxidizer tank 22 and fuel tank 23 of first stage 12 are manifolded through first stage outlet valves 24 and 26 through pairs of manifold valves 28, 29 and 30, 31 which are required to optionally stage first stage 12 or second stage 14 first. As will be discussed below, this optional staging ability allows for redundant stages and increased reliability. Associated with the manifold valves 28, 29, 30 and 31 are quick disconnects 32 and 34 which permit separation of the two stages at any time. Second stage propellant tank 20 has oxidizer and fuel outlet valves 36, 38 similar to those of first stage tanks 18. The first stage 12 has three engines 40, 42, 44 which have oxidizer inlet valves 46, 48 and 50 and fuel inlet valves 52, 54 and 56. The second stage 14 also has three engines 58, 60 and 62 which have oxidizer inlet valves 64, 66 and 68 and fuel inlet valves 70, 72, 74. Additionally, second stage 14 is preferably a stage and a half in that the outboard engines 58 and 62 can be staged at any time during the second stage 14 burn by means of quick disconnects 76, 78, 80 and 82 just below the inlet valves.

The operation sequence of the interstage manifolding will next be described for a nominal launch. Starting with lift off, all valves are open except second stage outlet valves 36 and 38. Thus during first burn all engines are utilizing propellants from the first stage tanks 18 only. To initiate the end of the first stage burn, valve changes and disconnect activations are, in rapid sequence as follows:

(1) Open second stage tank outlet valves 36 and 38.
(2) Close all first stage engine inlet valves 46, 48, 50, 52, 54 and 56.
(3) Close manifold valves 28, 29, 30 and 31.
(4) Close stage one outlet valves 24 and 26.
(5) Activate disconnects 32 and 34.

As noted above, the sequence provides the desired propellant transfer during a nominal launch. Additionally, the manifolding in combination with the staging capability of stages 12 and 14 can provide significant reliability increases. This may be appreciated from consideration of several launch scenarios and the appropriate manifolding and staging sequence for each scenario which are briefly discussed below.

Should the first stage 12 fail during first burn the separation sequence described above is initiated at that time. This early sequence initiation may preferably be triggered by a ground based crew monitoring standard in flight telemetry (shown schematically as block 81 in FIG. 4) for indications of imminent stage failure. For example, the following telemetry may be used: (1) In propulsion, propellant tanks, manifolds and engine compartments; temperatures, pressures and indications of fire and; (2) In avionics; false indicators such as timing sequences, cut off signals, and engine actuator positions.

Should the second stage 14 fail during first burn as sensed by telemetry shown schematically as block 83 in FIG. 4 two design options exist: jettison second stage 14 immediately or retain second stage 14, burning the stage 2 propellant with the stage 1 engines. The first option is preferable from the standpoint of vehicle reliability, in that it reduces the probability that the second stage 14 failure will propagate into other parts of the vehicle. However, for some vehicle configurations, the second stage 14 structure may be essential to the delivery of thrust loads from first stage 12 to third stage 15 and for providing structural stability for wind and other dynamic loads. Thus, the continuing presence of second stage 14 may be required until the burn out and staging of first stage 12. In the first option, wherein second stage 14 is jettisoned, the following actions occur in rapid sequence.

(1) Close all engine inlet valves on second stage 14, i.e., valves 64, 66, 68, 70, 72 and 74.
(2) Close manifold valves 28, 29, 30 and 31.
(3) Activate disconnects 32 and 34.

For the second option where second stage 14 is retained and first stage 12 engines burn all of the propellants from first stage 12 and second stage 14, the following sequence of actions is taken (to burn the propellants in second stage 14 first, followed by burning the propellants in first stage 12):

(1) Close all the engine inlet valves on second stage 14, i.e., valves 64, 66, 68, 70, 72 and 74.

(2) Activate engine separation mechanisms 76, 78, 80 and 82.

ity during the first burn. With the addition of the Atlas "strap on" first stage it is projected that the performance and cost per launch should increase to about 1.5 and 1.4 times that of Atlas IIA, respectively.

TABLE 1

THREE AND ONE HALF STAGE VEHICLE WEIGHT AND PERFORMANCE DATA
ONE BOOSTER ENGINE OUT IN STAGE ONE AT LIFTOFF

| BURN NO. | TIME (SEC) | | | WEIGHT (LBS) PROPELLENT BURNOUT | | THRUST (LBF) | | VACUUM SPECIFIC IMPULSE (SEC) | FUEL FLOW RATE LB/SEC |
|---|---|---|---|---|---|---|---|---|---|
| | START | BURN TIME | END OF BURN TOTAL | BURNED | STAGED | SEA LEVEL | VACUUM | | |
| 1 | 0 | 103.34 | 103.3 | 338000 | 26259 | 860957 | 964118 | 295.2 | 3270.8 |
| 2 | 103.3 | 68.86 | 172.2 | 144306 | 8493 | 549839 | 615721 | 293.8 | 2095.6 |
| 3 | 172.2 | 326.42 | 498.6 | 80474 | 10631 | 72397 | 81072 | 330.9 | 246.5 |
| 4 | 498.6 | 477.59 | 976.2 | 35664 | 4508 | 30362 | 34000 | 460.0 | 74.7 |

Gross Weight at liftoff 662445
GEO 4634
GTO 9628
LEO 19610

(3) Open second stage propellant tank outlet valves 36 and 38.

(4) Close first stage 12 propellant tank outlet valves 24 and 26.

This status of the manifold permits burning of propellants from second stage 14 tanks while holding propellants in first stage 12. Subsequently, just before depletion of propellant tanks in second stage 14:

(1) Open first stage propellant tank outlet valves 24 and 26.

(2) Close second stage propellant tank outlet valves 36 and 38.

Figure 3C:
FIG. 3(c) is a top view of the improved launch vehicle of FIG. 3(b).

In general, for N stages burning in parallel each of the N-1 stages would be manifolded to the Nth stage as shown in FIG. 3. This, in effect, would provide manifolding among the tanks of all stages through the Nth stage manifold segment. Thus, during each of the N burns, propellant could be supplied to all of the engines participating in that burn from any combination of stage tanks present during that burn.

Compared to the Atlas IIA launch vehicle, the improved Atlas launch vehicle 10 of the present invention has a payload performance of approximately 9,600 and 4,600 lbs to GTO and GEO respectively, about 1.5 times that of Atlas IIA. The respective lengths L are 155 ft and 160 ft. Weight and performance data for the improved Atlas launch Vehicle of the present invention are presented in Table 1. The payload performance data are shown for Geosynchronous Stationary Orbit (GEO), Geosynchronous Transfer Orbit (GTO) and Low Earth Orbit (LEO). The LEO is 240N Mi circular at 28.5° inclination, the proposed orbit for the United States Space Station. This is the orbit used in all of the abort to 1 LEO capabilities discussed subsequently. The performance is based upon the assumption that a booster engine in the first stage 12 fails immediately after liftoff. Thus, the vehicle has an engine-out capability during the first burn. With the addition of the Atlas "strap on" first stage it is projected that the performance and cost per launch should increase to about 1.5 and 1.4 times that of Atlas IIA, respectively.

The redundant stage capability of the improved Atlas of the present invention and attendant increased reliability will next be discussed. Should first stage 12 fail and be staged at liftoff, the Atlas second stage 14 and Centaur stage 15 could provide a successful abort to LEO. However, should second stage 14 fail at lift off, it would be retained and the first stage 12 thrust would provide inadequate thrust to weight to continue the mission. However, should second stage 14 fail at a time after half of the first burn time (about 50 seconds) sufficient propellant would have been burned so that the thrust to weight would be adequate to provide successful abort to orbit. Therefore, the configuration of FIG. 3(a) provides considerable redundancy with respect to abort to orbit and the associated increased reliability. Additional redundant stage capabilities and advantages may be obtained by employing the disclosure of Applicant's copending application for Multistage Launch Vehicle Employing Interstage Propellant Transfer and Redundant Staging, filed concurrently herewith, the disclosure of which is incorporated herein by reference.

A vehicle in accordance with the present invention, having higher performance and reliability has the same configuration as 3(a) except that the sustainer engine 2 of the Atlas stages is replaced with a booster engine 1 or 3 identical to those currently in the stage. This provides higher thrust and a more conservative engine-out strategy. Thus, it may be assumed that an engine fails in the second stage 14 immediately after liftoff. This provides an engine-out capability during both the first and second burns. The redundant stage capabilities of this vehicle are comparable to those of configuration 3(a). However, the performance is greater and the probability of an engine failure effecting the mission is reduced. Weight and performance data for this improved Atlas launch vehicle of the present invention are present in Table 2.

TABLE 2

THREE AND ONE HALF STAGE VEHICLE WEIGHT AND PERFORMANCE DATA
WITH SUSTAINER ENGINE REPLACED BY BOOSTER ENGINE
ONE BOOSTER ENGINE OUT IN STAGE TWO AT LIFTOFF

| BURN NO. | TIME (SEC) | | | WEIGHT (LBS) PROPELLENT BURNOUT | | THRUST (LBF) | | VACUUM SPECIFIC IMPULSE (SEC) | FUEL FLOW RATE LB/SEC |
|---|---|---|---|---|---|---|---|---|---|
| | START | BURN TIME | END OF BURN TOTAL | BURNED | STAGED | SEA LEVEL | VACUUM | | |
| 1 | 0 | 109.21 | 109.2 | 505771 | 36177 | 1193604 | 1336623 | 288.9 | 4631.17 |
| 2 | 109.2 | 109.21 | 218.4 | 202108 | 8493 | 477442 | 534649 | 288.9 | 1850.64 |
| 3 | 218.4 | 86.43 | 304.8 | 80474 | 11209 | 238721 | 267325 | 288.9 | 931.10 |
| 4 | 304.8 | 353.12 | 658.0 | 52564 | 6666 | 60724 | 68000 | 460.0 | 148.86 |

Gross Weight at lift off 921086

TABLE 2-continued

| | |
|---|---|
| GEO | 7362 |
| GTO | 15000 |
| LEO | 30174 |

Figure 5A:
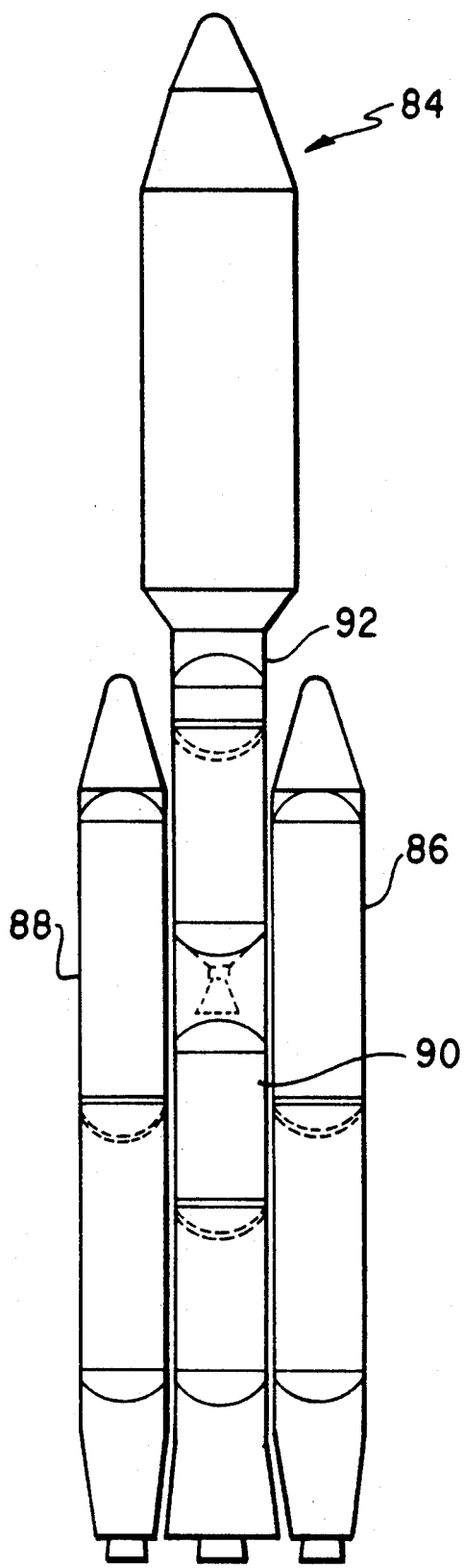
FIGS. 5(a) and 5(b) are a side and top view, respectively, of an alternate embodiment of the improved launch vehicle of the present invention employing two additional parallel stages.

Another vehicle in accordance with the present invention having higher performance, 84, is illustrated in FIG. 5(a). Increased performance is provided by adding two Atlas "strap-on" stages to a modified Atlas IIA vehicle 84. The two "strap-on" Atlas stages 86 and 88 would serve as the first and second vehicle stages with a one and a half Atlas third stage 90 and a Centaur fourth stage 92 forming the central launch vehicle stack. The three Atlas stages have propellant manifolding as described above in relation to FIG. 4, and burn in parallel. The Centaur stage 92 burns in series with the central Atlas stage 90. Dimensions of the various stages are illustrated in FIG. 5(a) for one preferred embodiment. The vehicle gross weight is slightly more than 1,000,000 lbs and the performance to GTO and GEO are approximately 18,000 and 9,000 pounds respectively. Weight and performance data for the improved launch vehicle of FIG. 5(a) are presented in Table 3, assuming a booster engine fails in stage 1 immediately after liftoff. It will be appreciated, however, that various other specific dimensions, weight and thrust values are possible, and may be optimized for specific launch applications.

For the vehicle configuration illustrated in FIG. 5(a), stages 86 and 88 are redundant at lift off, i.e., should first stage 86 or second stage 88 fail it would be jettisoned immediately providing an abort to orbit capability for the remaining stages and payload. Additionally, the thrust and propellant and stage weights of stage one 86 and two 88 are nearly identical. Accordingly, if an engine failed benignly on either stage during first burn, that stage would be staged at the end of first burn, thus providing more thrust during second burn. Should central stage 90 fail it would have to be retained to continue to provide the thrust structure for loads delivered from stages 86 and 88 to stage 92. Should the failure of stage 90 occur at lift off the thrust delivered by stages 86 and 88 would probably be inadequate to continue the mission depending on the specific mission requirements. However, should stage 90 fail after part way into first burn, an abort to orbit would typically be successful. Therefore, the vehicle configuration illustrated in FIG. 5(a) provides considerable redundancy with respect to an abort to orbit scenario.

The improved launch vehicle of FIG. 5(a) is estimated to provide almost three times the performance of the Atlas IIA launch vehicle and is estimated to have a cost per launch of about 1.7 times that of Atlas IIA.

The overall length L of the vehicle 84 is 177 ft in the preferred embodiment upon which the above noted estimates are based, as compared to 155 ft for the Atlas IIA. Although, the overall length of the core stack is longer than Atlas IIA, during first burn the core stage 90 is stiffened by its separable attachments to the two lower stages 86 and 88. Also, the vehicle has reached an altitude above which high altitude winds are no longer a problem before second stage 88 staging.

The most conservative strategy for the improved launch vehicle 84 from the standpoint of reliability would be to assume a booster engine fails in the third stage immediately after liftoff. However, this has the effect of reducing the thrust for each of burns 1, 2 and 3 by that of a booster engine. Weight and performance data for this case are presented in Table 4. The assumed lower thrusts during the first three burns yield a GEO performance of approximately 5700 lbs. This is less than two thirds of the performance for the strategy of a booster engine failure in the first stage illustrated in Table 3. The improved launch vehicle of FIG. 5(a) could be reconfigured by replacing the Atlas stages sustainer engines, 2 with booster engines 1 or 3. The weight and performance data for the case of a booster engine failure in the third stage immediately after liftoff are presented in Table 5. This yields a higher performance and a lower probability of effecting the mission due to engine failure than for the improved launch vehicle of FIG. 5(a).

Figure 6A:
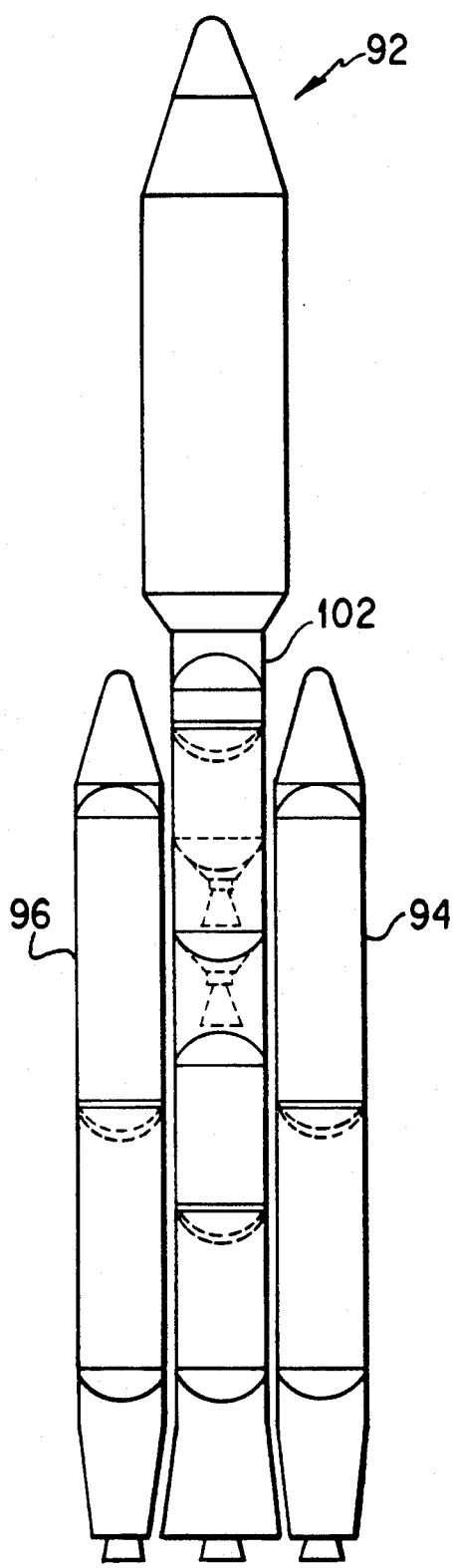
FIGS. 6(a), 6(b) and 6(c) are a side and two top views, respectively, of an alternate embodiment of the improved launch vehicle of the present invention employing three additional parallel stages.

Another Atlas IIA derivative launch vehicle is illustrated in FIG. 6(a). This vehicle employs four modified Atlas stages and a modified Centaur upper stage in a four and a half stage vehicle configuration, the third stage preferably being a one and a half stage.

Figure 6B:
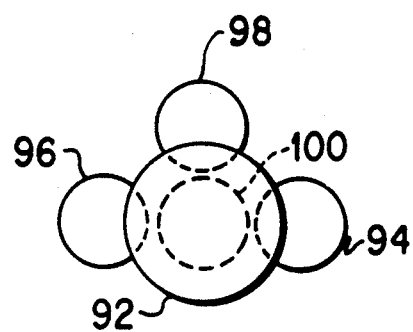
Figure 6C:
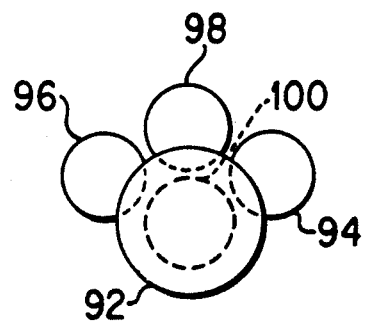

The first stage is comprised of two Atlas stages 94 and 96 of the same length. The second stage, 98 shown in FIGS. 6(b) and 6(c), with alternative stage arrangements,

TABLE 3

FOUR AND ONE HALF STAGE VEHICLE WEIGHT AND PERFORMANCE DATA
ONE BOOSTER ENGINE OUT IN STAGE ONE AT LIFTOFF

| BURN NO. | TIME (SEC) START | BURN TIME | END OF BURN TOTAL | WEIGHT (LBS) PROPELLENT BURNOUT BURNED | STAGED | THRUST (LBF) SEA LEVEL | VACUUM | VACUUM SPECIFIC IMPULSE (SEC) | FUEL FLOW RATE LB/SEC |
|---|---|---|---|---|---|---|---|---|---|
| 1 | 0 | 63.60 | 63.6 | 341500 | 26294 | 1410796 | 1579839 | 294.7 | 5369.46 |
| 2 | 63.6 | 88.04 | 151.6 | 369500 | 26574 | 1099678 | 1231442 | 293.8 | 4196.96 |
| 3 | 151.6 | 68.86 | 220.5 | 144306 | 8493 | 549839 | 615721 | 293.8 | 2095.64 |
| 4 | 220.5 | 326.42 | 546.9 | 80474 | 10631 | 72397 | 81072 | 330.9 | 246.54 |
| 5 | 546.9 | 353.12 | 900.0 | 52564 | 6666 | 60724 | 68000 | 460.0 | 148.86 |

| | |
|---|---|
| Gross Weight | 1085474 |
| GEO | 9215 |
| GTO | 17816 |
| LEO | 33727 |

TABLE 4

FOUR AND ONE HALF STAGE VEHICLE WEIGHT AND PERFORMANCE DATA
ONE BOOSTER ENGINE OUT IN THIRD STAGE AT LIFTOFF

TABLE 4-continued

| BURN NO. | TIME (SEC) | | END OF BURN TOTAL | WEIGHT (LBS) PROPELLENT BURNOUT | | THRUST (LBF) | | VACUUM SPECIFIC IMPULSE (SEC) | FUEL FLOW RATE LB/SEC |
|---|---|---|---|---|---|---|---|---|---|
| | START | BURN TIME | | BURNED | STAGED | SEA LEVEL | VACUUM | | |
| 1 | 0 | 63.60 | 63.6 | 341500 | 26294 | 1410796 | 1579839 | 294.7 | 5369.46 |
| 2 | 63.6 | 112.45 | 176.0 | 369500 | 26574 | 860957 | 964118 | 293.8 | 3285.99 |
| 3 | 176.0 | 121.69 | 297.7 | 144306 | 8493 | 311118 | 348397 | 293.8 | 1185.83 |
| 4 | 297.7 | 326.42 | 624.2 | 80474 | 10631 | 72397 | 81072 | 330.9 | 246.54 |
| 5 | 624.2 | 353.12 | 977.3 | 52564 | 6666 | 60724 | 68000 | 0.0 | 148.86 |

Gross Weight 1084653
GEO 5714
GTO 12528
LEO 27615

TABLE 5

FOUR AND ONE HALF STAGE VEHICLE WEIGHT AND PERFORMANCE DATA
WITH SUSTAINER ENGINE REPLACED BY BOOSTER ENGINE
ONE BOOSTER ENGINE OUT IN THIRD STAGE AT LIFTOFF

| BURN NO. | TIME (SEC) | | END OF BURN TOTAL | WEIGHT (LBS) PROPELLENT BURNOUT | | THRUST (LBF) | | VACUUM SPECIFIC IMPULSE (SEC) | FUEL FLOW RATE LB/SEC |
|---|---|---|---|---|---|---|---|---|---|
| | START | BURN TIME | | BURNED | STAGED | SEA LEVEL | VACUUM | | |
| 1 | 0 | 86.01 | 86.0 | 637214 | 45588 | 1909766 | 2138596 | 288.9 | 7408.36 |
| 2 | 86.0 | 93.43 | 179.4 | 432746 | 30948 | 1193604 | 1336623 | 288.9 | 4631.94 |
| 3 | 179.4 | 77.98 | 257.4 | 144306 | 8493 | 477442 | 534649 | 288.9 | 1850.64 |
| 4 | 257.4 | 86.43 | 343.8 | 80474 | 10631 | 238721 | 267325 | 288.9 | 931.10 |
| 5 | 343.8 | 353.12 | 697.0 | 52564 | 6666 | 60724 | 68000 | 0.0 | 148.86 |

Gross Weight 1469051
GEO 23064
GTO 12671
LEO 44035 and third stage 100 are single Atlas stages. All four Atlas stages burn in parallel with propellant manifolding that has manifold segments connecting Atlas stages 94, 96 and 98 to the third stage 100 as described in FIG. 4. The fourth stage is a modified Centaur 102 which burns in series. The gross weight of the launch vehicle illustrated in FIG. 6(a) is about 1,500,000 lbs with performance to GEO of approximately 14,000 lb. Weight and performance data are shown in Table 6. The overall length of the vehicle L is about 175 ft in one preferred embodiment.

Atlas stages 94, 96 and 98 have a redundant stage capability at lift off. If either booster 94, 96 of the first stage or second stage 98 failed it would be jettisoned immediately. If stage 100 failed after a sufficient burn time, it would be retained and the manifold valves would be set to burn the propellant from stage 100 with the engines of the other stages (as discussed in relation to FIG. 4). For any of these cases the velocity delivered to the Centaur and payload would be sufficient for the Centaur to execute an abort to orbit. The performance is based upon the assumption that a booster engine in one of the first stages 94 or 96 fails immediately after liftoff. Thus, the vehicle has an engine-out capability during the first burn. The same considerations for engine-out strategy and replacing the sustainer engine with a booster engine are applicable to FIG. 6(a) 92 as those described for the improved launch vehicle of FIG. 5(a).

TABLE 6

FOUR AND ONE HALF STAGE VEHICLE WEIGHT AND PERFORMANCE DATA
TWO ATLAS STAGES FOR STAGE ONE
ONE BOOSTER ENGINE OUT IN STAGE ONE AT LIFTOFF

| BURN NO. | TIME (SEC) | | END OF BURN TOTAL | WEIGHT (LBS) PROPELLENT BURNOUT | | THRUST (LBF) | | VACUUM SPECIFIC IMPULSE (SEC) | FUEL FLOW RATE LB/SEC |
|---|---|---|---|---|---|---|---|---|---|
| | START | BURN TIME | | BURNED | STAGED | SEA LEVEL | VACUUM | | |
| 1 | 0 | 98.78 | 98.8 | 737600 | 53133 | 1960635 | 2195560 | 294.4 | 7467.36 |
| 2 | 98.8 | 87.87 | 186.6 | 368800 | 26567 | 1099678 | 1231442 | 293.8 | 4196.97 |
| 3 | 186.6 | 68.86 | 255.5 | 144306 | 8493 | 549839 | 615721 | 293.8 | 2095.64 |
| 4 | 255.5 | 314.58 | 570.1 | 77574 | 10602 | 72397 | 81072 | 330.9 | 246.59 |
| 5 | 570.1 | 352.44 | 922.5 | 52464 | 6665 | 60724 | 68000 | 460.0 | 148.86 |

Gross Weight 1508724
GEO 14296
GTO 25604
LEO 46486

Figure 5B:
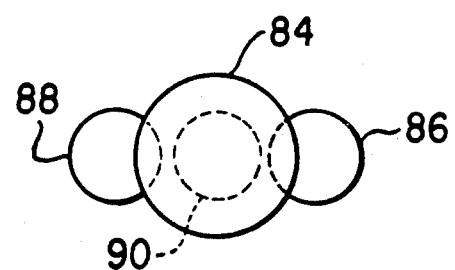

Considering the vehicles illustrated in FIGS. 3, 5 and 6 as a family, all of the "strap on" Atlas stages require the same propellant within a few percent. Therefore, a standard "strap on" booster could be produced for all of those stages. Similarly the Atlas core stages could be standardized. Also, two different length Centaurs could serve the family. For both the Atlas IIA and the new family, three standard stage modules would be required; 1) the current Atlas one and a half stage module, 2) a modified Atlas "strap-on" module and 3) a "short" core stage Atlas. Standardizing stage and propulsion modules should have a beneficial effect on production and operations costs. Alternatively existing stages may be employed with somewhat less than optimum performance.

Figure 7A:
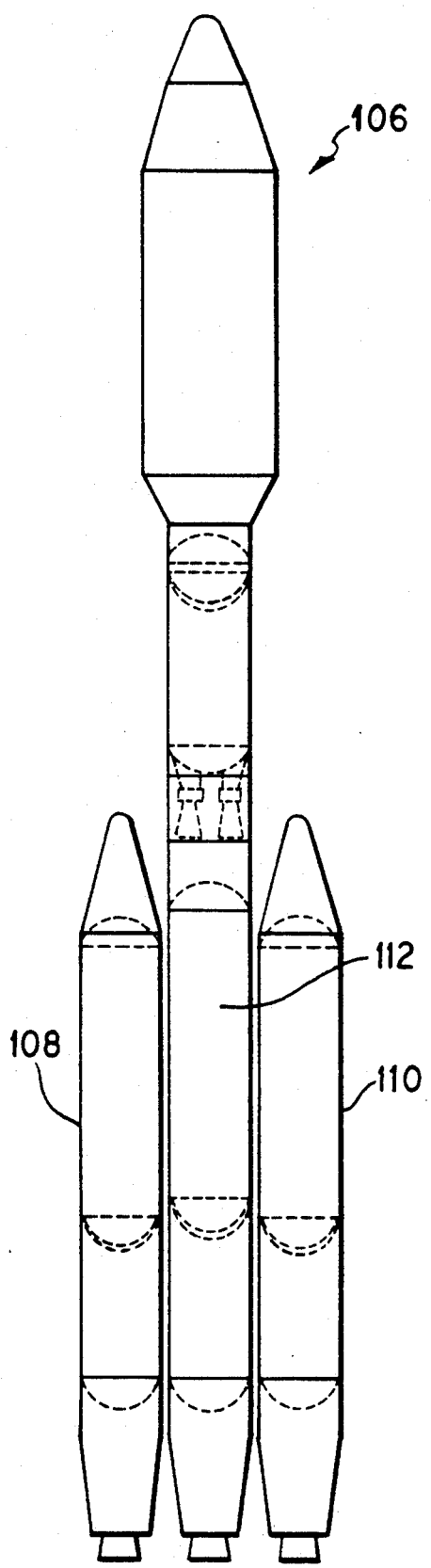
FIGS. 7(a) and 7(b) is a side view of an alternate embodiment of the improved launch vehicle of the present invention employing sets of lower and upper stages burning in parallel.
Figure 7B:
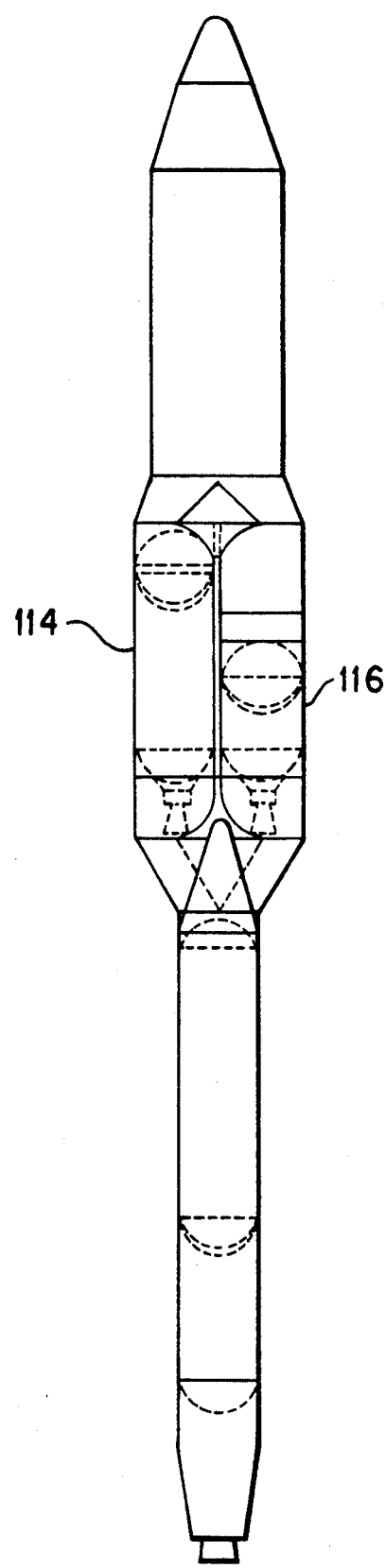

Another Atlas IIA derivative launch vehicle, 106 is illustrated in separate side views in FIGS. 7(a) and 7(b), respectively. It utilizes parallel burn with propellant manifolding in both the lower and the upper stages. The two sets of stages burn in series. The first stage of the vehicle utilizes two Atlas stages 108 and 110. The second stage is a single Atlas stage 112. The third and fourth stages illustrated are modified Centaur stages, 114 and 116 each with two RL10 engines with 34,000 lbs. thrust. The overall length of the vehicle is approximately 190 ft. staging of stage 1 is at an altitude above which there is no longer a problem with high altitude wind loads. Weight and performance data are shown in Table 7 for the case of a booster engine failing in one of the Atlas first stages 108 or 110 immediately after lift off and an engine failing in the third stage Centaur 114 at the time of ignition. The gross weight of the improved vehicle, 106 would be about 1,085,436 lbs. with performance to GEO of approximately 11,000 lbs. Should the more conservative strategy of an engine out in the second stage be assumed, the vehicle performance would be reduced significantly as in the case of the improved launch vehicle of FIG. 5(a).

110 to stages 114 and 116. Should the failure of stage 112 occur at liftoff the thrust delivered to stages 108 and 110 would probably be inadequate to continue the mission depending on the specific mission requirements. However, should stage 112 fail after part way into first burn, an abort to orbit would typically be successful. Therefore, the vehicle configuration illustrated in FIG. 7 provides considerable redundancy with respect to an abort to orbit scenario.

The improved launch vehicle of FIG. 7, 106 could be reconfigured by replacing Atlas stages sustainer engines 2 with booster engines 1 or 3. The weight and performance data, for this case with a booster engine failure in the second stage immediately after liftoff, are presented in Table 8. This yields a higher performance and a lower probability of effecting the mission due to engine failure than for an improved launch vehicle, 106.

The improved launch vehicle, 106 has some stage redundancy with respect to completing a GEO mission successfully in spite of a stage failure, provided the payload weight is sized to handle such a contingency. Table 9 illustrates a case where the payload has been reduced to approximately 10,000 lbs. which would pro-

TABLE 7

FOUR STAGE VEHICLE WEIGHT AND PERFORMANCE DATA
ONE BOOSTER ENGINE OUT IN STAGE ONE AT LIFTOFF
ONE ENGINE OUT IN STAGE THREE AT IGNITION

| BURN NO. | TIME (SEC) START | BURN TIME | END OF BURN TOTAL | WEIGHT (LBS) PROPELLENT BURNOUT BURNED | STAGED | THRUST (LBF) SEA LEVEL | VACUUM | VACUUM SPECIFIC IMPULSE (SEC) | FUEL FLOW RATE LB/SEC |
|---|---|---|---|---|---|---|---|---|---|
| 1 | 0 | 108.92 | 108.9 | 585000 | 41814 | 1410796 | 1579839 | 294.7 | 5370.78 |
| 2 | 108.9 | 149.83 | 258.8 | 314500 | 30975 | 549839 | 615721 | 293.8 | 2098.98 |
| 3 | 258.8 | 259.09 | 517.8 | 57814 | 7336 | 91086 | 102000 | 460.0 | 223.14 |
| 4 | 517.8 | 326.74 | 844.6 | 24514 | 4024 | 30362 | 34000 | 460.0 | 75.03 |

Gross Weight 1085436
GEO 11392
GTO 19798
LEO 42942

For the vehicle configuration illustrated in FIG. 7, first stage Atlases 108 and 110 are redundant at liftoff, i.e., should either fail it would be jettisoned immediately providing an abort to orbit capability for the remaining stages and payload. Should the central stage 112 fail it would have to be retained to continue to provide the vide for the loss of either of the Atlas stage ones 108 or 110. Additionally, since the second stage Atlas 112 would become redundant at a point during first burn, the 10,000 lbs. payload mission to GEO would generally have a redundant Atlas stage capability to complete the mission.

TABLE 8

FOUR STAGE VEHICLE WEIGHT AND PERFORMANCE DATA
WITH SUSTAINER ENGINE REPLACED BY BOOSTER ENGINE
ONE BOOSTER ENGINE OUT IN STAGE TWO AT LIFTOFF
ONE ENGINE OUT IN STAGE THREE AT IGNITION

| BURN NO. | TIME (SEC) START | BURN TIME | END OF BURN TOTAL | WEIGHT (LBS) PROPELLENT BURNOUT BURNED | STAGED | THRUST (LBF) SEA LEVEL | VACUUM | VACUUM SPECIFIC IMPULSE (SEC) | FUEL FLOW RATE LB/SEC |
|---|---|---|---|---|---|---|---|---|---|
| 1 | 0 | 133.22 | 133.2 | 987173 | 70609 | 1909766 | 2138596 | 288.9 | 7410.05 |
| 2 | 133.2 | 144.47 | 277.7 | 267869 | 27636 | 477442 | 534649 | 288.9 | 1854.10 |
| 3 | 277.7 | 259.09 | 536.8 | 57814 | 7336 | 91086 | 102000 | 460.0 | 223.14 |
| 4 | 536.8 | 326.74 | 863.5 | 24514 | 4024 | 30362 | 34000 | 460.0 | 75.03 |

Gross Weight 1469051
GEO 14791
GTO 25038
LEO 52336 thrust structure for loads delivered from stages 108 and

TABLE 9

FOUR STAGE VEHICLE WEIGHT AND PERFORMANCE DATA
WITH SUSTAINER ENGINE REPLACED BY BOOSTER ENGINE
EITHER ATLAS IN STAGE ONE FAILS AT LIFTOFF
ONE ENGINE OUT IN STAGE THREE AT IGNITION

| TIME (SEC) | WEIGHT (LBS) PROPELLENT | THRUST (LBF) | VACUUM | FUEL FLOW |

TABLE 9-continued

| BURN NO. | START | BURN TIME | END OF BURN TOTAL | PELLENT BURNOUT BURNED | STAGED | SEA LEVEL | VACUUM | SPECIFIC IMPULSE (SEC) | RATE LB/SEC |
|---|---|---|---|---|---|---|---|---|---|
| 1 | 0 | 99.92 | 99.92 | 493587 | 35304 | 1273177 | 1425731 | 288.9 | 4940 |
| 2 | 99.92 | 144.57 | 244.49 | 267869 | 27636 | 477442 | 534649 | 288.9 | 1854.10 |
| 3 | 244.49 | 259.19 | 503.68 | 57814 | 7336 | 91086 | 102000 | 460.0 | 223.14 |
| 4 | 503.68 | 86.32 | 590.00 | 24514 | 4024 | 30362 | 34000 | 460.0 | 75.03 |

| | |
|---|---|
| Gross Weight | 940160 |
| GEO | 9831 |
| GTO | 17535 |
| LEO | 32940 |

Addressing the redundancy capabilities for the Centaur stages three and four, 114 and 116, Table 10 illustrates a 4,000 lb. payload capability to GEO should the Centaur stage three fail at ignition. Thus, the payload capability would be severely restricted to achieve a redundant Centaur stage capability.

For all of the improved launch vehicle 106 configurations, the center line of the payload is coincident with the center line of the two Centaur stages while burning in parallel during the third burn. Therefore, the payload center line is offset from whichever Centaur stage provides the last burn. Accordingly, the gimbal angles of the engines must be sufficiently large to provide thrust through the center of gravity during the last burn.

The performance data for all of the Atlas IIA derivative vehicles are based upon rough optimization of stage sizes. Accordingly, it is expected that actual vehicle performance capabilities will be greater than those appearing in Tables 1 through 10. Additionally, it is expected that all of the vehicle performances can be increased by the utilization of solid rocket motors burning in parallel with the liquid propulsion stages.

vehicles. Thus, using the most recent small sample of 20, the projected reliability would be 0.95. Accordingly, the best reliability estimate would be in the range of 0.92 to 0.95.

To project the failure probabilities for the derivative vehicles with one engine-out and stage redundancy for the Atlas stages, the types of failures that contribute to the Atlas 0.05 failure probability must be identified.

A major consideration for each Atlas failure is whether it would have been benign or catastrophic with respect to being able to shut it down and stage it enabling an abort to orbit. There were ten engine failures which were all benign shutdowns with the possible exception of one. That failure was a leak in a booster hot gas generator ducting which could have lead to failure of other components in the stage. Accordingly, for the purposes of this analysis, it is assumed that there were effectively 9.5 benign failures and 0.5 catastrophic failures. There were three other failures which were largely in the Flight Controls, all of which would have been benign under conditions where the stage could be shutdown and jettisoned if necessary. The results are

TABLE 10

FOUR STAGE VEHICLE WEIGHT AND PERFORMANCE DATA WITH SUSTAINER ENGINE REPLACED BY BOOSTER ENGINE ONE BOOSTER ENGINE OUT IN STAGE TWO AT LIFTOFF STAGE THREE FAILS TO THRUST AT IGNITION

| BURN NO. | TIME (SEC) START | BURN TIME | END OF BURN TOTAL | WEIGHT (LBS) PROPELLENT BURNOUT BURNED | STAGED | THRUST (LBF) SEA LEVEL | VACUUM | VACUUM SPECIFIC IMPULSE (SEC) | FUEL FLOW RATE LB/SEC |
|---|---|---|---|---|---|---|---|---|---|
| 1 | 0 | 133.22 | 133.2 | 987173 | 70609 | 1909766 | 2138596 | 288.9 | 7410.05 |
| 2 | 133.2 | 144.47 | 277.7 | 267869 | 27636 | 477442 | 534649 | 288.9 | 1854.10 |
| 3 | 536.8 | 326.74 | 863.5 | 24514 | 4024 | 30362 | 34000 | 460.0 | 75.03 |

| | |
|---|---|
| Gross Weight | 1469051 |
| GEO | 4029 |
| GTO | 8731 |
| LEO | 18096 |

VEHICLE RELIABILITY COMPARISONS

It has been shown recently that the current U.S. mature expendable launch vehicle reliabilities (not including design failures) are limited by failures associated with processing (manufacturing, assembling, testing and operating) the vehicles. Using a set of 260 and 69 Atlas and Centaur space launches, the stage failures due to vehicle processing were found to be 13 and 2 respectively. This yields a failure ratio (probability) of 0.05 for the Atlas and 0.03 for the Centaur. Thus, using these data, the projection for the probability of failure of the Atlas IIA would be 0.08 which results in a 0.92 probability of success (The probabilities of failures of launch vehicles and their subsystems are sufficiently small so that adding the individual failure probabilities of individual elements yields an adequate estimate of their combined failure probabilities). On the other hand, there was one failure in the last twenty Atlas/Centaur summarized in Table 11. Shown, also, are the estimated failure probabilities per stage of an interstage propellant manifold system. In making this estimate it must be understood that the propellant lines and valves shown in FIG. 4 are largely associated with the propulsion subsystems of the individual stages. Specifically, only the pairs of manifold valves 28, 29 and 30, 31 and the disconnect devices 32 and 34 are required to provide interstage propellant transfer. Accordingly, it should be expected that this subsystem could be made highly reliable by means of redundancy.

The projected failure probabilities of a two-engine improved Centaur stage with an engine-out capability are shown in Table 12. The projections are based upon flight failure history of United Stages cryogenic stages, i.e., Saturn and Centaur.

Using the values shown in Tables 11 and 12, the failure probabilities, and mean number of launches between failures can be projected for the Atlas IIA derivative vehicles. The specific projections will be made for the improved launch vehicle with 3 Atlas stages with 9 engines, and the two upper stage Centaurs with four engines. The engine-out strategy is for an Atlas booster engine failing in stage two 112 immediately after liftoff and an engine failure in stage three 114 at ignition. The first projection to be made is the benign failure probability for the 9 Atlas engines which would be ignited at lift off. Neglecting the time dependence of engine failures and using an average benign failure probability of 0.012 per engine from Table 11, Table 13 presents the projected benign failure probabilities for zero, one, zero or one, and two or more engines.

TABLE 11

Atlas Stage Failure History
(260 Space Vehicle Launches)

| Type of Failure | Number of Failures | Ratio Per Stage | Failure Per Engine (3 engines) |
|---|---|---|---|
| Benign | | | |
| Propulsion | 9.5 | 0.0365[1] | 0.012 |
| Other | 3 | 0.012 | N/A |
| Total Benign | 12.5 | 0.048[1] | N/A |
| Catastrophic | | | |
| Propulsion | 0.5 | 0.002 | |
| Other | 0 | | |
| Total Catastrophic | | 0.002 | N/A |

Projected Manifold Subsystem Failure Probabilities

| | Per Stage |
|---|---|
| Benign | 0.003 |
| Catastrophic | 0.0015 |

[1] with no engine-out capability

TABLE 12

Projected Upgraded Centaur Failure Probabilities
2 Engines with Engine-Out Capability

| | Per Unit | Per Stage |
|---|---|---|
| Benign | | |
| Propulsion | 0.011 | $(0.011)^2 =$ 0.0001 |
| Engine Segment | | |
| Stage Level | 0 | |
| Propellant Manifold | 0.003 | 0.003 |
| Guidance | 0 | |
| Other | 0.005 | 0.005 |
| Total | | 0.008 |
| Catastrophic | | |
| Engine Segment | 0.0015 | 0.0030 |
| Stage Level | 0.0015 | 0.0015 |
| Propellant Manifold | 0.0015 | 0.0015 |
| Guidance | 0.001 | |
| Other | 0 | |
| Total | | 0.006 |

TABLE 13

Benign Engine Failure Probabilities
(9 Atlas Engines)

| Number of Engine Failures | Projected Failure Probabilities |
|---|---|
| Zero | $(1 - 0.012)^9 = 0.897$ |
| One | $9(0.012)(1 - 0.012)^8 = 0.098$ |
| Zero or one | $= 0.995$ |
| Two or more | $(1 - 0.995) = 0.005$ |

The benign propulsion failure probability of 0.005 can be combined with the "other" and benign manifold failure probabilities (see Table 11) for the three Atlas stages which is approximately 3 (0.012)=0.036 plus 3 (0.003)=0.009 respectively for a total of approximately 0.050 probability that an Atlas stage would fail benignly leading to an abort mode. Addressing the Centaur operations, the vehicle would enter an abort mode should either fail benignly. From Table 12, the probability of this occurring is approximately 2(0.008)=0.016. Thus, the total probability of the vehicle entering an abort mode is 0.05+0.016=0.066. to achieve a successful abort, at least one Centaur must function properly, the probability of which is approximately $(1-0.014)+2(0.014)(1-0.014)\approx 1.0$ (Table 12). Thus, the projected probability of a successful abort is 0.066. On the other hand, an abort to orbit would be unsuccessful due to a catastrophic failure in any stage (including the manifold subsystem). For Atlas, the probability is approximately 3(0.0035)=0.011 from Table 11 and for Centaur, the probability is approximately 2(0.006)=0.012 (Table 12). Therefore, the projected probability of failing to abort to orbit would be about 0.011+0.012=0.023.

The above probabilities are summarized in Table 14.

TABLE 14

| Description | Acronym | Value |
|---|---|---|
| Atlas Benign Failure Probability | ABFP | 0.050 |
| Centaur Benign Failure Probability | CBFP | 0.016 |
| Atlas Catastrophic Failure Probability (including manifold subsystem) | ACFP | 0.011 |
| Centaur Catastrophe Failure Probability | CCFP | 0.012 |
| Abort to Orbit Failure Probability | AOFP | 0.023 |
| Abort to Orbit Success Probability | AOSP | 0.066 |

Failures to achieve mission successfully would be caused by any failure in any Atlas stage or Centaur, which is approximately the sum of the benign and catastrophic failure probabilities of the Atlas and Centaur stages, which from table is 0.089.

The projected mean number of launches between aborts to orbit, and mission successes due to no failures in the launch vehicle (the reciprocal of the failure probabilities) would be 15 (1/0.066) and 11 (1/0.089) respectively. However, with successful refueling in the environs of a space station, mission success would become nearly synonymous with successful abort to orbit. The probability of turning a successful abort into a successful mission with a refueled Centaur would be (0.066)(1−0.014)=0.064. Thus, the total probability of success would be (1−0.089)+0.064=0.975. Accordingly the mean number of launches between mission failures would become 40, 1/(1−0.975). This should be compared with the mean number of launches between mission failure due to a failure in the vehicle 1/0.089=11. Thus, it can be seen that this invention, by means of the abort to orbit capability, increases the mean number of launches between mission failures by a factor of about 3.6. It is important to note that, with the abort mode operations, the overall mission failure probability is reduced to (1−0.975)=0.025 which is very nearly equal to the 0.023 catastrophic failure probability of the launch vehicle. Thus, the effect of the redundant stage and the capability to abort to the space station orbit is to effectively remove the contribution of the vehicle benign failure probability from the probability of mission failure. Sizing the stage four Centaur to transfer the payload from LEO to its mission orbit would ensure that the stage three Centaur would arrive in LEO with its propellant depleted when all stages perform properly. Thus, the Centaur stage three at the end of a mission would generally be available in LEO to be refueled in the environs of the space station or returned to Earth in the Shuttle for reuse for another mission.

Considering the case of the improved launch vehicle illustrated in Table 9, where one of the two Atlas stages in stage one fails and is staged at liftoff an estimate of the probability of achieving mission success to GEO can be made. Starting with the assumption any one of the three Atlas stages can fail benignly and still have mission success, Table 15 illustrates Atlas stage benign failure probabilities, from Table 11.

TABLE 15

| Atlas Stage Benign Failure Probabilities | |
|---|---|
| Number of Failures | Projected Probabilities |
| Zero | $(1 - 0.015)^3 = 0.9557$ |
| One | $3(0.015)(1 - 9.015)^2 = 0.0437$ |
| Zero or one | 0.9994 |
| Two or more | 0.0006 |

The mission would fail due to two or more benign Atlas failures or any catastrophic failure, which from Tables 11 and 15 is the sum $0.0006 + 3(0.0035) = 0.0011$. Additionally, the mission would fail if either Centaur stage failed which from Table 12 is approximately $2(0.014) = 0.028$. Thus, the probability of mission failure is 0.039, for an approximate reliability 0.96 which can be achieved without benefit of on-orbit operations utilizing the Shuttle or space station. This is a substantial improvement over the reliability of $(1 - 0.089) \approx 0.91$ shown previously where any failure, benign or catastrophic, causes a mission failure.

The present invention thus provides an improved launch vehicle which: 1) circumvents the high altitude upper wind loads limitations of current expendable launch vehicles, 2) yields higher performance, 3) permits employment of engine-out and redundant stage capabilities to achieve increased reliability, for example, by aborting to LEO. It will be appreciated that the present invention has only been illustrated by the above described embodiments and many other specific configurations may be provided while remaining within the scope of the present invention. Also, the foregoing estimated advantages in reliability and performance are not exhaustive of the features and advantages of the present invention and are merely illustrative thereof.

I claim:

1. An improved launch vehicle, comprising:
   a first stage having propellant tank, engine and thrust structure coupling the propellant tank and engine;
   a second stage, coupled to said first stage in a side-by-side configuration so as to allow parallel burning of said first and second stages, said second stage having a propellant tank, engine and thrust structure, said second stage having a length substantially the same as or less than said first stage;
   means operatively associated with said first and second stages for sensing benign failure conditions in said stages;
   means for transferring propellant from said first stage to said second stage, said propellant transferring means including flow control means reconfigurable in response to sensed benign failure conditions; and
   a payload configured on top of, and in a series staging relationship with, said second stage.

2. An improved launch vehicle as set out in claim 1, wherein said means for transferring propellant comprises a manifold structure coupling said propellant tank of said first stage and said engine of said second stage and a valve mechanism for restricting propellant flow between said second stage propellant tank and said second stage engine during the first stage burn.

3. An improved launch vehicle as set out in claim 1, wherein said means for transferring controls the propellant transfer such that said first and second stage engine burn propellant only from said first stage propellant tanks until the first stage propellant is depleted.

4. An improved launch vehicle as set out in claim 3, further comprising means for separating the first and second stages and staging the first stage after depletion of the propellant in the first stage.

5. An improved launch vehicle as set out in claim 1, further comprising a third stage configured in series with said second stage, said third stage having a propellant tank, thrust structure and engine, and wherein said payload is configured on top of said third stage.

6. An improved launch vehicle as set out in claim 5, wherein said first stage is releasably coupled to said third stage and is substantially the same length as said second and third stages together.

7. An improved launch vehicle as set out in claim 1, wherein said first and second stages have substantially equal total thrust at liftoff.

8. An improved launch vehicle as set out in claim 1, wherein each of said first and second stages have plural engines and one or more of said plural engines of said first stage are staged before completion of the first stage burn and wherein one or more of the plural engines of the second stage are staged before completion of the second stage burn.

9. An improved launch vehicle as set out in claim 7, wherein the total thrust at liftoff of each of said first and second stages is approximately 620,00 lbs.

10. An improved launch vehicle as set out in claim 1, wherein said means for transferring propellant comprises:
    a first set of propellant lines coupling the first stage propellant tank to the first stage engine, including first stage propellant tank outlet valve and a second stage engine inlet valve;
    a second stage propellant tank outlet valve for preventing flow of propellant from said second stage propellant tanks to said second stage engines during propellant transfer along said first set of propellant lines; and
    means for detaching said first set of propellant lines during staging of said first stage.

11. An improved launch vehicle as set out in claim 10, wherein said first and second stage propellant tanks each comprise a fuel tank and an oxidizer tank and wherein said first set of propellant lines comprises a propellant line coupling the first stage oxidizer tank to the second stage engines and a propellant line coupling the first stage fuel tank to the second stage engines.

12. An improved launch vehicle, comprising:
    a first stage having a first propellant tank and first rocket engine;
    a second stage configured in parallel with said first stage and having a propellant tank and rocket engine, the second stage having substantially the same thrust to weight ratio as that of the first stage;

means operatively associated with said first and second stages for sensing benign failure conditions in said stages;

an interstage propellant transfer system for transferring propellant between the first stage and the second stage, said propellant transfer system including flow control means reconfigurable in response to sensed benign failure conditions; and a payload.

13. An improved launch vehicle as set out in claim 12, further comprising a third stage, having a propellant tank and rocket engine configured in series with said second stage, wherein said payload is in series with said third stage.

14. An improved launch vehicle as set out in claim 12, wherein said first stage further comprises a second propellant tank and second rocket engine separately coupled to said second stage and configured to burn in parallel with said second stage and the first propellant tank and first rocket engine.

15. An improved launch vehicle as set out in claim 14, wherein said interstage propellant transfer system couples both the first and second propellant tanks of the first stage to the engines of the second stage.

16. An improved launch vehicle as set out in claim 14, wherein said second propellant tank and second rocket engine of said first stage have substantially the same thrust to weight ratio as the second stage.

17. An improved launch vehicle as set out in claim 14, further comprising a third stage, having a propellant tank and rocket engine, configured to burn in parallel with said first and second stages, and having a fourth stage, having a propellant tank and rocket engine, configured in series with said third stage, and wherein said payload is configured in series with said fourth stage.

18. An improved launch vehicle as set out in claim 17, wherein said interstage propellant transfer system couples the third propellant tanks of the first stage to the engine of the second stage.

19. An improved launch vehicle as set out in claim 18, wherein the third propellant tank and third rocket engine of said third stage have substantially the same thrust to weight ratio as the second stage.

20. An improved launch vehicle as set out in claim 19, wherein the first propellant tank and first rocket engine, second propellant tank and second rocket engine and third propellant tank and third rocket engine of the first stage are arranged symmetrically around the second stage in a side-by-side relationship therewith.

21. An improved launch vehicle of the type having in flight telemetry for monitoring operation of critical flight parameters, comprising:

a first stage having one or more separate first stage structures, each first stage structure having a propellant tank and rocket engine;

a second stage configured in parallel with said first stage and having a second stage propellant tank and second stage rocket engine;

staging means, responsive to a staging signal indicative of a benign failure condition in the first stage or second stage and provided in response to monitoring of said flight telemetry, for coupling the first stage and second stage and for decoupling and releasing said first stage in response to said staging signal;

an interstage propellant transfer system for transferring propellant from the first stage propellant tanks to the engines of the second stage, said interstage propellant transfer system including means for separating in response to said staging signal; and a payload configured in series with said second stage.

22. An improved launch vehicle as set out in claim 21, further comprising a third stage, having a third stage propellant tank and third stage rocket engine, configured in series with said second stage, and wherein said payload is configured in series with said third stage.

23. An improved launch vehicle as set out in claim 22, wherein said first stage has first and second separate first stage structures and wherein said staging means comprises separate staging mechanisms coupling said first first stage structure and said second first stage structure to said second stage and wherein said separate staging mechanisms are independently operable.

24. An improved launch vehicle as set out in claim 21, wherein said staging signal is provided by ground based telemetry monitoring personnel.

25. An improved launch vehicle comprising:

a first stage having one or more separate structures each separate structure having a propellant tank and rocket engine;

a second stage configured in parallel with said first stage and having a second stage propellant tank and second stage rocket engine;

means operatively associated with said first and second stages for sensing benign failure conditions in said stages;

an interstage propellant transfer system for providing propellant from one or more of the first stage propellant tank to the second stage engines, said propellant transfer system including flow control means reconfigurable in response to sensed benign failure conditions;

an upper stage configured on top of and in series with said second stage, said upper stage comprising a first upper stage and a second upper stage, each having a propellant tank and rocket engine, the first and second upper stages being configured to burn in parallel;

an upper stage propellant transfer system for transferring propellant from the first upper stage propellant tanks to the engines of the second upper stage; and a payload configured on top of, and in series with, said upper stage.

26. An improved launch vehicle as set out in claim 25, further comprising first staging means for staging the first stage upon depletion of the propellant in the first stage and upper staging means for staging the first upper stage upon depletion of the propellant in the first upper stage.

27. A method for controlling the in flight staging sequence of a launch vehicle having a first stage and a second stage burning in parallel at liftoff and a third stage in series with said second stage, and further having an interstage propellant manifolding system having first stage engine inlet valves and tank outlet valves and second stage engine inlet vales and tank outlet vales, comprising the steps of:

monitoring the flight telemetry of the launch vehicle for indication of a benign failure in the first stage; and upon detection of a benign failure in the first stage performing the following sequence:

opening the second stage tank outlet valves;
closing the first stage engine inlet valves;
disconnecting the first and second stages; and
closing the first stage tank outlet valves.

28. A method for controlling the in flight staging sequence of a launch vehicle having a first stage, a second stage burning in parallel with said first stage, an interstage propellant transfer system for transferring propellant between said first and second stages, and a third stage and payload configured in series with said second stage, comprising the steps of:
- igniting the first and second stages at liftoff, both stages burning propellant from said first stage;
- monitoring the flight telemetry of the launch vehicle; and
- upon detection of a benign failure in the second stage:
  - shutting off the second stage engines; and
  - initiating transfer of propellant from said second stage to said first stage;
  - continuing to burn said first stage engines until the propellant both first and second stages is depleted; and
  - jettisoning said first and second stages.

29. A method for controlling the in flight staging sequence of a launch vehicle having a first stage, a second stage burning in parallel with said first stage, an interstage propellant transfer system for transferring propellant between said first and second stages, and a third stage and payload configured in series with said second stage, comprising the steps of:
- igniting the first and second stages at liftoff, both stages burning propellant from said first stage;
- monitoring the flight telemetry of the launch vehicle; and
- upon detection of a benign failure in the first stage:
  - shutting down the first stage engines;
  - continuing to burn the second stage engines with propellant from the first stage until the first stage propellant is depleted; and
  - upon depletion of propellant in the first stage, jettisoning the first stage.

* * * * *